United States Patent

Bonkowski et al.

[11] Patent Number: 5,123,228
[45] Date of Patent: Jun. 23, 1992

[54] HEATER PLATE FOR HEAT PRINTING PACKAGING MATERIAL

[75] Inventors: Lorne Bonkowski; Peter H. Sust, both of Stockton, Calif.

[73] Assignee: Forma-Pack, L.P., Stockton, Calif.

[21] Appl. No.: 758,165

[22] Filed: Sep. 11, 1991

Related U.S. Application Data

[63] Continuation of Ser. No. 345,898, May 1, 1989, abandoned, which is a continuation-in-part of Ser. No. 301,223, Jan. 24, 1989, abandoned.

[51] Int. Cl.⁵ .................. B65B 21/00; B65B 53/02
[52] U.S. Cl. .................................. 53/398; 53/442; 156/212; 156/245; 156/499
[58] Field of Search .............. 53/48.2, 141, 290, 398, 53/442, 453, 454, 556, 557, 559, 563, 580; 156/69, 212, 215, 245, 322, 499; 219/456, 457, 458, 459, 464, 521, 243; 264/322

[56] References Cited

U.S. PATENT DOCUMENTS

| | | | |
|---|---|---|---|
| 3,411,974 | 11/1968 | Jones-Hinton et al. | 156/499 X |
| 3,744,626 | 7/1973 | Dreyfus | 53/398 X |
| 3,964,237 | 6/1976 | Johansen | 53/559 X |
| 3,988,093 | 10/1976 | Birchenaugh | 53/509 X |
| 4,130,619 | 12/1978 | Held | 156/245 X |
| 4,688,367 | 8/1987 | Bonkowski | 53/48 X |
| 4,809,852 | 3/1989 | Mancini | 215/32 X |

Primary Examiner—John Sipos
Assistant Examiner—Linda B. Johnson
Attorney, Agent, or Firm—Spensley Horn Jubas & Lubitz

[57] ABSTRACT

A heater plate for a heat-printed carrier process is provided in which the contact surface of the heater plate is shaped so as to reduce the formation of air pockets between the sheet and the contact surface of the heater plate.

12 Claims, 5 Drawing Sheets

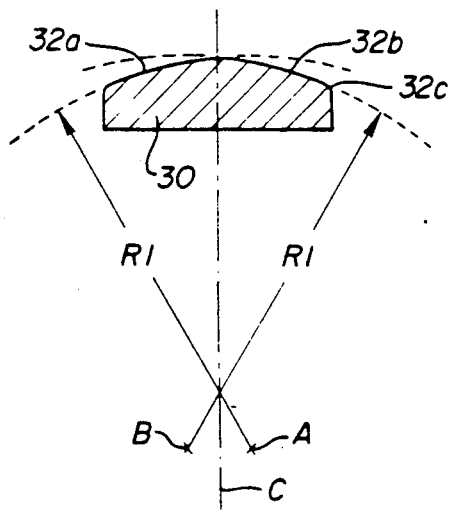
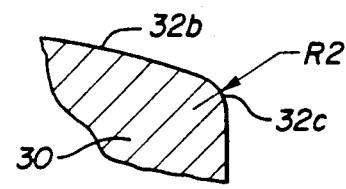
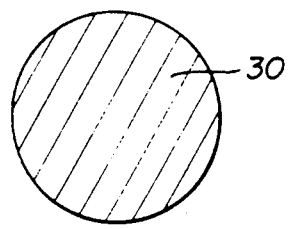
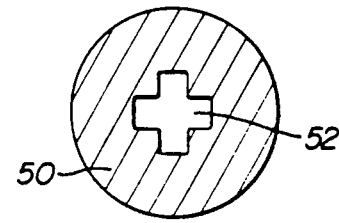
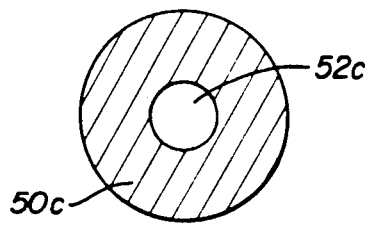
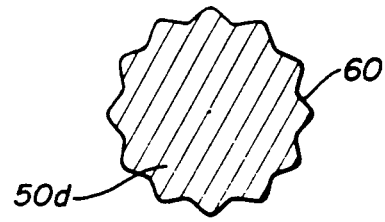
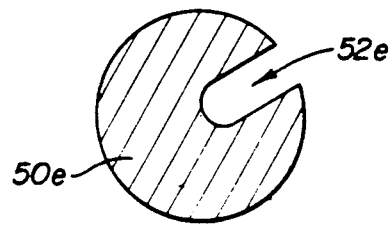

HEATER PLATE FOR HEAT PRINTING PACKAGING MATERIAL

This is a continuation of application Ser. No. 345,898 filed on May 1, 1989, now abandoned, which is a continuation-in-part application of application Ser. No. 301,223, filed Jan. 24, 1989, now abandoned.

BACKGROUND OF THE INVENTION

1. Field of the Invention.

The present invention relates to heater plates, and more particularly, to heater plates for heat printing packaging materials such as, for example, carriers and covers for containers.

2. Description of Related Art.

A method and apparatus for "heat printing" carriers or covers for a plurality of containers is described in U.S. Pat. No. 4,688,367 by Bonkowski. As described therein, a carrier, for packaging an array of articles as a single unit, such as the common six-pack beverage can container, may be formed by placing a sheet of thermoplastic material near or upon a heated platen or anvil. The platen typically has a generally flat contact area which transfers heat to the sheet ("heat printing") to soften the area in contact or near proximity to the heated platen. After a portion of the sheet has been softened in appropriate areas, the sheet is transferred to a position adjacent to the containers for stretch forming the sheet over the containers. A forming device draws the softened portion of the sheet, along with any non-softened areas bordering the softened portion, over and around a surface of the container or package intended to be covered or held, thereby stretching the softened areas. The softened portion of the sheet is then allowed to cool to its unsoftened, relatively rigid state, resulting in a carrier that covers the top and portions of the sides of each article.

The above described heat printing method and apparatus has been found to provide a very effective cover and carrier for packaging articles such as containers. However, one problem that has been encountered is the tendency for small pockets of air to become trapped between the contact surface of the platen and the thermoplastic sheet to be softened. These air pockets can act as an insulating film to inhibit the transfer of heat from the platen to the sheet. As a result, small portions of the sheet may not become sufficiently softened to properly stretch over the top of the container. Consequently, the carrier may not properly seal the top of the container. Also, undesired holes may develop in the top of the sheet.

SUMMARY OF THE INVENTION

It is an object of the present invention to provide an improved heater plate for heat printing a thermoplastic sheet, obviating, for practical purposes, the above-mentioned limitations.

These and other objects and advantages are achieved in a heater plate having a contact surface which is shaped so as to prevent substantial pockets of air from being trapped between the plate contact surface and the sheet. In the illustrated embodiment, the plate includes a body having a contact surface which is generally dome-like in shape. More specifically, the cross-section of the contact surface is a somewhat flattened curve which is sufficiently curved to inhibit the formation of air pockets yet sufficiently flattened to prevent undesired stretching of the softened plastic.

A preferred embodiment of the present invention is described in greater detail in connection with the following drawings.

BRIEF DESCRIPTION OF THE DRAWINGS

FIG. 9 is a cross-sectional view of a heater plate body;

FIG. 10 is a cross-sectional view of the edge of the heater plate body of FIG. 9; and FIGS. 11A-11E are cross-sectional views of alternative heater plate-bodies.

DETAILED DESCRIPTION OF THE DRAWINGS

Figure 1:
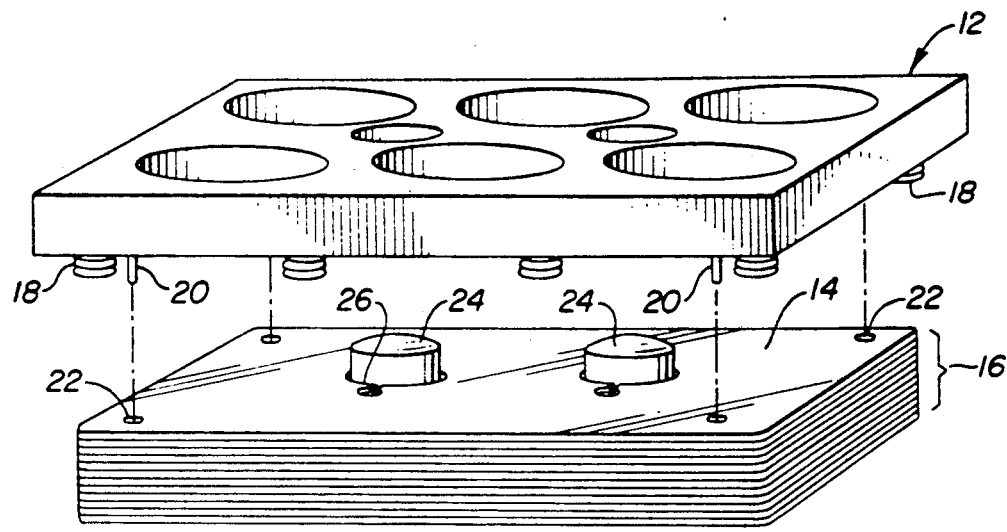
FIG. 1 is a schematic diagram illustrating a form plate picking up a plastic sheet in a heat printing operation.

A process for forming a heat printed carrier utilizing a heater plate 10 in accordance with a preferred embodiment of the present invention, is schematically illustrated in FIGS. 1-7. Referring first to FIG. 1, in the first step of the process, a form plate 12 picks up a thermoplastic sheet 14 from a stack 16 of such plastic sheets using vacuum cups 18 and registration pins 20 which register with holes 22 of the stack 16 of plastic sheets. A pair of alignment rods 24 are received within central finger holes 26 (best seen in FIG. 2) to maintain the stack 16 of plastic sheets in an aligned position. Although the process will be described for the formation of a single six-pack carrier, it should be appreciated that many such carriers an be formed simultaneously by utilizing a forming plate 12 of sufficient size. In addition, carriers of greater size than a six-pack can be formed by utilizing plastic sheets 14 of appropriately larger size. For example, it has been found that a carrier pack of 144 beverage cans can be conveniently formed using a plastic carrier sheet which is approximately 24 times the size of that illustrated in FIG. 1.

Figure 2:
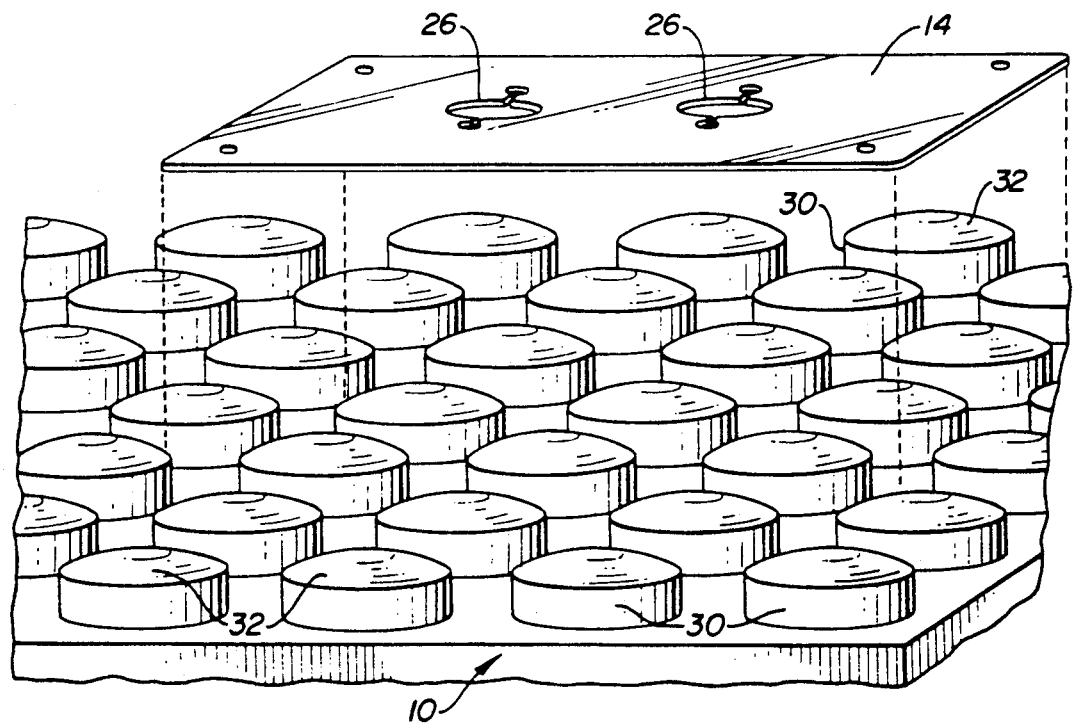
FIG. 2 schematically illustrates a plastic sheet being heat printed by a heater plate.
Figure 3:
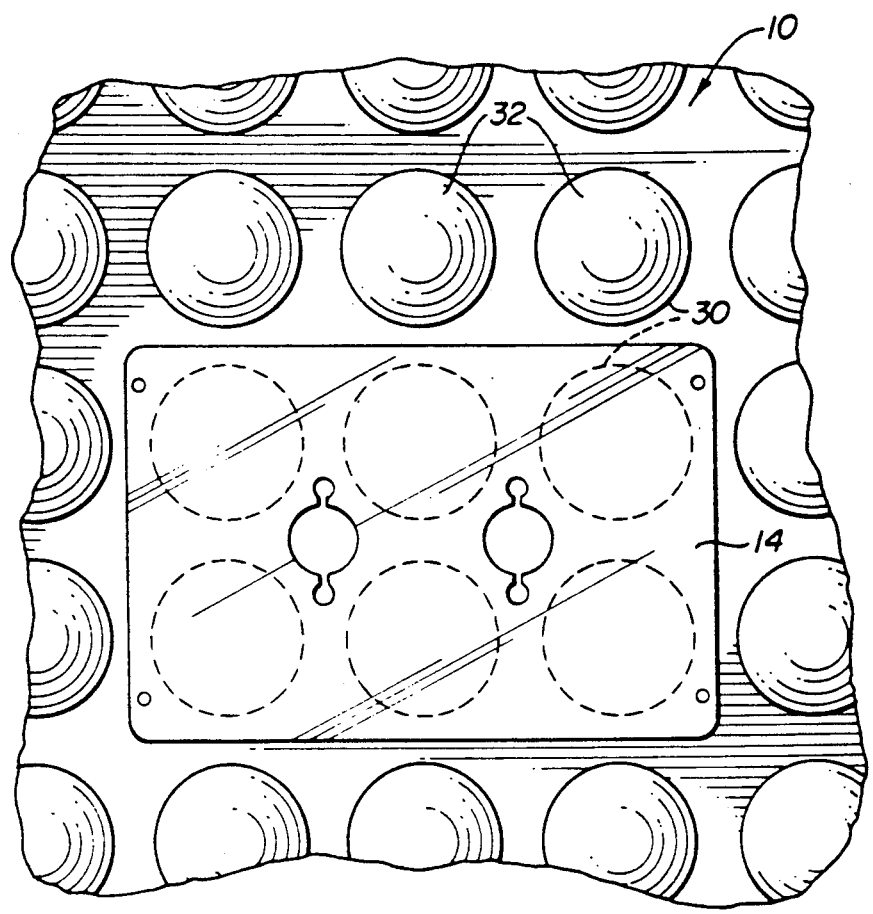
FIG. 3 is a top view of the heat printing operation of FIG. 2.

FIGS. 2 and 3 illustrate a carrier sheet 14 being lowered onto the heater plate 10 to heat print the sheet 14. The sheet 14 is placed onto the heater plate 10 by the forming plate 12 which has been ommitted from the remaining figures for purposes of clarity. The heater plate 10 comprises a plurality of button-shaped bodies 30 which are heated to the desired temperature by a heater (not shown). As will be explained in greater detail below, each heater plate body 30 has a specially curved contact surface 32 which is designed to substantially eliminate the formation of air pockets between the body contact surface 32 and the plastic sheet 14 as it is lowered onto the heater plate.

Figure 4:
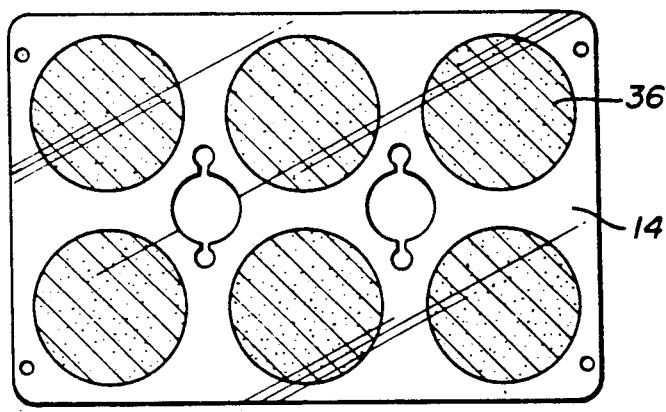
FIG. 4 schematically illustrates a heat printed sheet.

The carrier sheet 14 is allowed to remain in contact with the contact surfaces 32 of the heater plate 10 until six heat softened areas are formed in the carrier sheet 14 as schematically represented by the shaded areas 36 in FIG. 4. As shown therein, the heat softened areas 36 have the same circular outline as the heater bodies 30 of the heater plate 10. In this manner the heat softened areas 36 are "heat printed" on the carrier sheet 14 by the heater plate 10.

Figure 5:
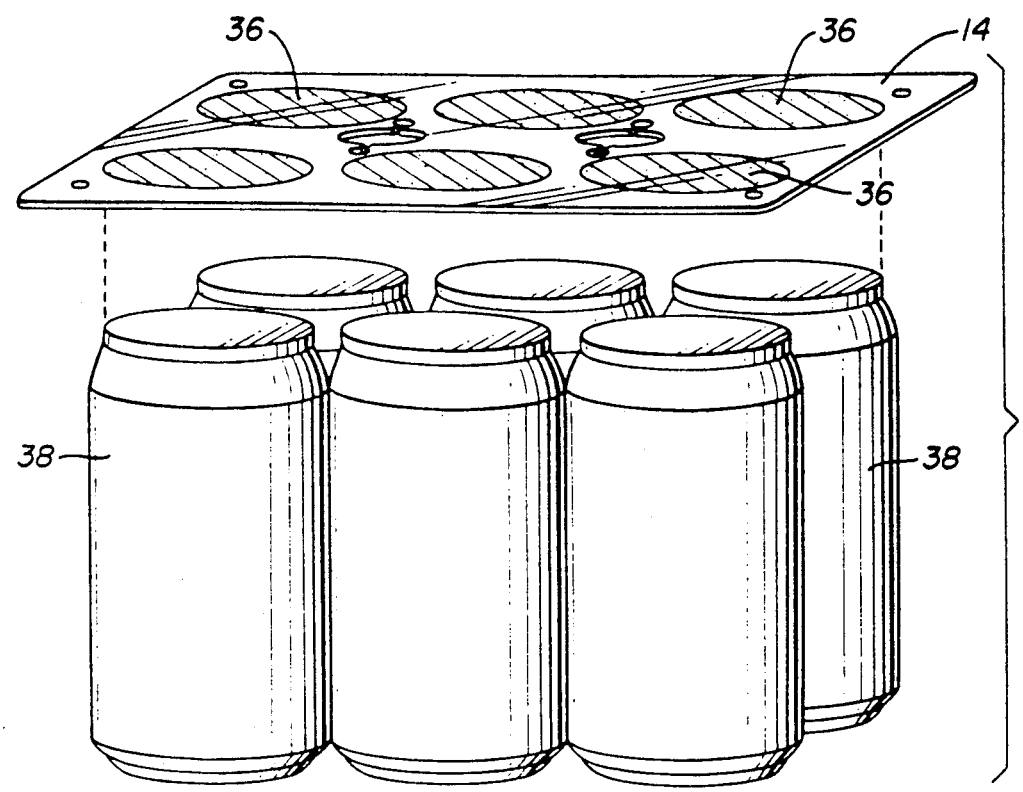
FIG. 5 schematically illustrates the placement of a heat printed carrier sheet over the tops of a six-pack of beverage containers.
Figure 6:
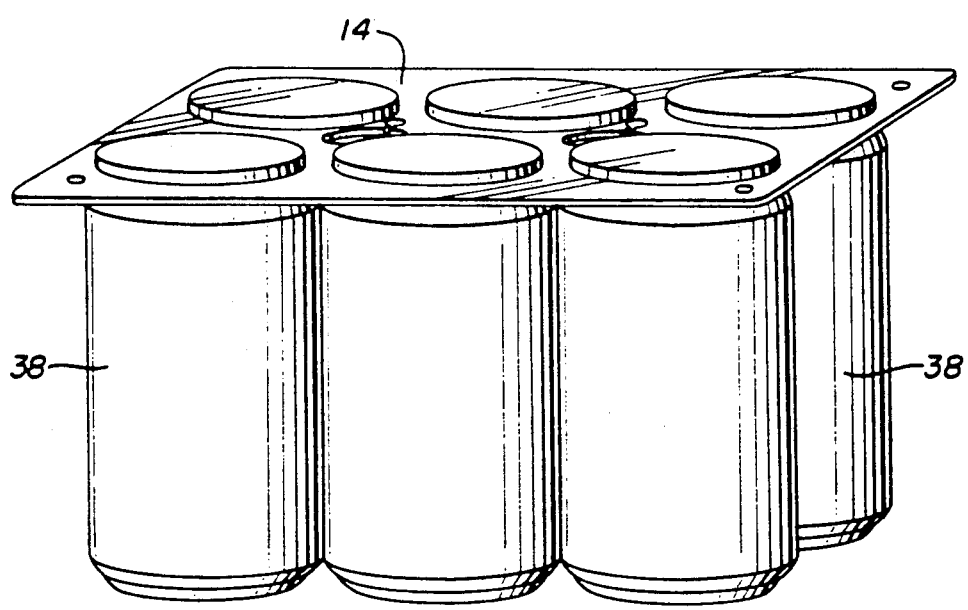
FIG. 6 illustrates a completed carrier package.
Figure 7:
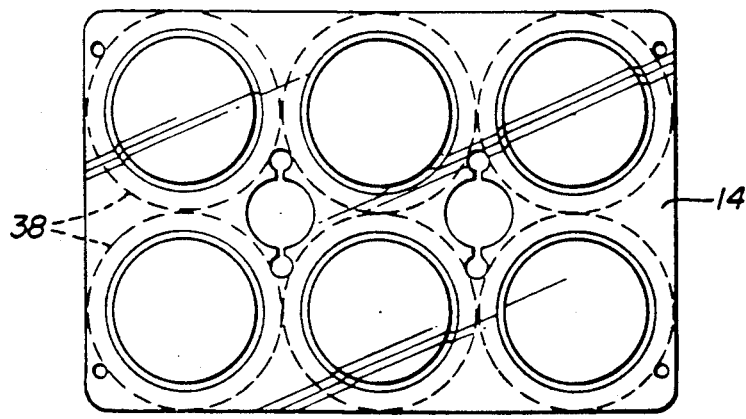
FIG. 7 is a top view of the package of FIG. 6.

Referring now to FIG. 5, the heat printed carrier sheet 14 is removed from the heater plate 10 and positioned over an array of containers such as the beverage cans 38 of FIG. 5. The heat softened areas 36 are positioned in registration with the beverage cans 38 so that when the heat printed carrier sheet 14 is lowered down over the beverage cans 38 by the forming plate 12 (not shown), the softened areas 36 of the heat printed sheet 14 are drawn and stretched over the top surfaces of the corresponding beverage containers as shown in FIGS. 6 and 7. When the heat printed carrier sheet 14 cools, the areas 36 become rigid again, thereby tightly gripping the beverage containers to form the multipack carrier package illustrated in FIGS. 6 and 7.

Figure 8A:
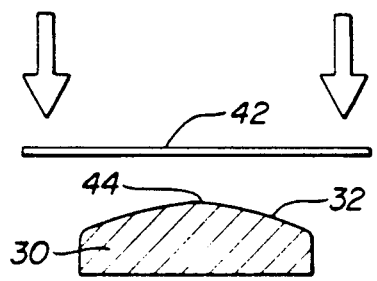
FIGS. 8A-8F illustrate the heat printing operation in greater detail.
Figure 8B:
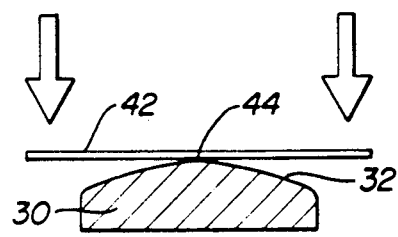
Figure 8C:
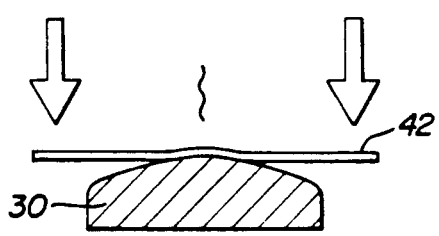
Figure 8D:
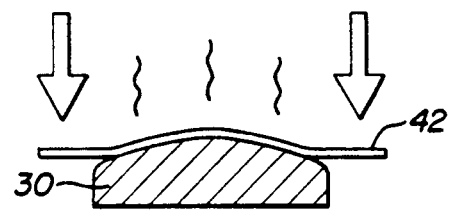
Figure 8E:
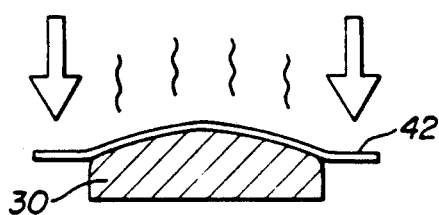
Figure 8F:
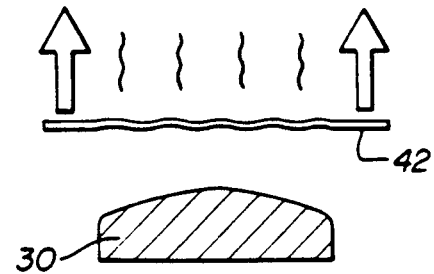

As previously mentioned, one problem encountered with the prior heat printing process was the tendency for air pockets to form between the carrier sheet and the contact surface of the platen for forming the heat softened areas of the carrier sheet. As explained in greater detail below in connection with FIGS. 8 and 9, the contact surface 32 of the heater plate bodies 30 of the illustrated embodiment are curved in a manner to minimize the formation of such air pockets. FIG. 8A shows a cross section of a typical heater plate body 30 with a segment 42 of a plastic sheet positioned by the forming plate (not shown) and ready to be lowered onto the heater plate body as illustrated in FIGS. 8B-8E. As shown in FIG. 8B, because of the dome-like shape of the contact surface 32 of the heater plate body, the carrier sheet segment 42 contacts the center portion 44 of the heater body contact surface 32 first. As the forming plate continues to press the carrier sheet downwardly as shown in FIGS. 8C-8E, any air between the carrier sheet and the contact surface 32 is progressively squeezed out as the heat softened portion of the carrier sheet segment concentrically grows larger, conforming itself to the shape of the heater body contact surface 32. Once the heat printed area of the carrier sheet segment has been formed, the forming plate lifts the carrier sheet away from the heater plate (FIG. 8F) and places the softened area over the top of a beverage can as described above. The contact area 32 is coated with Teflon to facilitate the removal of the carrier sheet from the heater plate upon the conpletion of the heat printing process.

In the illustrated embodiment, the contact surface 32 of the heater plate bodies is not perfectly spherical. Instead, the contact surface 32 comprises a first contact subsurface 32a having a radius of curvature R1 centered at a center indicated at A. A second subsurface 32b smoothly continuous with the first subsurface 32a also has a radius of curvature R1 but centered at a center B displaced from the center A. The contact surface 32 is rotationally symmetric about a center axis C such that the centers A and B are displaced equidistantly from the center axis C of the heater plate body 30. As can be seen in FIG. 9, the separation of the centers A and B tends to somewhat flatten the contact surface 32 as compared to a true spherical surface having a single center of curvature on the center axis of the body.

The flattened curvature of the contact surface 32 has been found to reduce the occurrence of over-stretching of the softened portion of the carrier sheet as the sheet is drawn over the contact surface 32. Over stretching can thin the softened portion to an undesirable extent and can also interfere with proper formation of the multipack carrier.

In the illustrated embodiment, the contact subsurfaces 32a and 32b each have a radius of curvature of 3.4375 inches, the centers of which are separated by a distance of 0.6500 inches. In addition, the contact area 32 has a diameter of 2.050 inches with a maximum height of 0.625 inches at the center and a minimum height of 2.975 inches at the perimeter. Such dimensions have been found to be desirable for use with a sheet thickness of 0.010 inches and beverage cans having a lid diameter of 2.340 inches and a central body diameter of 2.605 inches such as those beverage cans presently being marketed under the trade mark Pepsi. Thicker sheets which are generally less flexible may require a larger diameter body. Similarly, the tightness of the desired grip may affect the heater plate body diameter to container top diameter ratio.

In another aspect of the present invention, the peripheral edge 32c at the periphery of the contact area illustrated in FIGS. 9 and 10 has a rounded edge to reduce the occurrence of tearing of the softened portions of the carrier sheet. In the illustrated embodiment, the peripheral edge 32c has a radius of curvature of 0.100 inches. It has been found that providing the peripheral edge 32c with a much smaller radius of curvature than that of the subareas 32a or 32b provides a distinct border between the softened and unsoftened areas of the carrier sheet.

FIG. 11A shows a top cross-sectional view of the heater plate body 30 of FIGS. 2, 3, 8 and 9. As depicted therein, the heater body 30 has a simple, round perimeter and as best seen in FIGS. 3 and 8, has a solid top contact area 32 for heat transfer. This design serves well in many applications, including covering beverage containers as illustrated in FIG. 5-7. FIG. 11B shows a cross-sectional view of an alternative embodiment in which a heater plate body 50 has a cross-shaped area 52 relieved in the top of the body so that heat is not transferred to the plastic sheet in the area 52. FIG. 11C shows a similar heater body 50c having a round-shaped relief area 52c at which heat is not transferred to the plastic sheet. Using the heater plate bodies of FIGS. 11B and 11C would create covers or tops for articles with a region left thickened (that is unsoftened and therefore unstretched by the forming process) in the cover. Such a thickened region could be used, for example, to introduce a straw through a pre-perforated opening in the top.

FIG. 11D shows still another heater plate body 50d which has an irregular outside perimeter boundary 60. Such a boundary may be symmetrical or asymmetrical and can be used, for example, to strengthen the grip along the sidewall surfaces of the container or to create an attractive packaging effect.

FIG. 11E depicts a heater body 50e with a non-centered relief area 52e at one side of the contact area. The relief area 52e is useful to create a pull tab in a top, cover or carrier. Of course, a combination of heat relieved areas around or on top a heater plate body could be used to create a package cover with a number of different advantages or decorative effects.

It will, of course, be understood that various modifications of the present invention, in its various aspects, will be apparent to those skilled in the art, some being apparent only after study and others being matters of routine mechanical design. For example, the contact area of the heater plate body need not be symmetrical about a center axis and may utilize curvatures other than the curvatures depicted. Such additional curvatures include spherical, parabolic, hyperbolic and irregular curvatures. As such, the scope of the invention should not be limited by the particular embodiments herein described. It should be defined instead by the appended claims and equivalents thereof.

I claim:

1. A method of forming a carrier for a container from a thermoplastic sheet, comprising the steps of:
   heating a body having a heating surface adapted to be placed in physical contact with the sheet, said surface having a generally dome-like shape;
   placing a sheet of unsoftened thermoplastic in contact with the heating surface of the body so that a well defined portion of the sheet is softened, said portion being defined by the heating contact surface of the body;
   removing said sheet with the softened portion from the body; and
   placing the sheet over the top of a container with the softened portion of the sheet aligned with the top of the container and bringing the sheet in contact with the container so that said softened portion is drawn and stretched over the top of the container.

2. The method of claim 1 wherein the contact heating surface has a cross-section defined by a first curvature of a first radius centered at a first center, and a second curvature of a second radius centered at a second center, said first center being displaced from said second center.

3. The method of claim 1 wherein the contact heating surface includes a surface having a flattened hemispherical-like surface.

4. A method for forming a carrier for a container from a thermoplastic sheet, comprising:
   heating a body having a heating surface adapted to contact the sheet, said heating contact surface being sufficiently curved so as to prevent substantial pockets of air from being trapped between the body contact surface and the sheet as the sheet is placed in contact with the body contact surface;
   placing a sheet of unsoftened plastic in contact with the heating surface of the body so that a well defined portion of the sheet is softened, said portion being defined by the heating contact surface of the body;
   removing said sheet with the softened portion from the body; and
   placing the sheet over the top of a container with the softened portion of the sheet aligned with the top of the container and bringing the sheet in contact with the container so that said softened portion is drawn and stretched over the top of the container.

5. In a method for forming a cover for a container in which a heat-softened portion of a heat-printed thermoplastic sheet is formed about the top of a container, the improvement comprising:
   heating a heater plate having a contact heating surface adapted to be placed in physical contact with the sheet to heat-print the sheet, said contact surface having a shape generally higher at the center of the contact area and generally lower at the periphery of the contact area;
   placing a sheet of unsoftened plastic in contact with the heating surface of the body so that a well defined portion of the sheet is softened, said portion being defined by the heating contact surface of the body;
   removing the sheet with the softened portion from the body; and
   placing the sheet over the top of a container with the softened portion of the sheet aligned with the top of the container and bringing the sheet in contact with the container so that said softened portion is drawn and stretched over the top of the container.

6. The method of claim 2 wherein the second radius of curvature is significantly smaller than the first radius of curvature so that the heating contact surface provides a distinct border between the softened and the unsoftened areas of the plastic sheet.

7. The method of claim 1 wherein the body has a second surface which is recessed with respect to the heating contact surface of the body so that the recessed surface does not contact the sheet such that a second well defined portion of the sheet remains unsoftened, said second portion being defined by the recessed surface of the body.

8. The method of claim 7 wherein the recessed surface is centered within the heating contact surface of the body.

9. The method of claim 8 wherein the recessed surface is cross-shaped.

10. The method of claim 8 wherein the recessed surface is round-shaped.

11. The method of claim 7 wherein the recessed surface is located off center of the heating contact surface.

12. The method of claim 1 wherein the recessed surface is tab-shaped.

* * * * *